(12) United States Patent
Bunnell

(10) Patent No.: US 7,864,177 B2
(45) Date of Patent: Jan. 4, 2011

(54) SYSTEM AND METHODS FOR REAL-TIME RENDERING WITH GLOBAL AND SPECULAR ILLUMINATION

(75) Inventor: Michael T. Bunnell, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 291 days.

(21) Appl. No.: 12/214,814

(22) Filed: Jun. 23, 2008

(65) Prior Publication Data

US 2008/0259081 A1  Oct. 23, 2008

Related U.S. Application Data

(63) Continuation of application No. 11/880,658, filed on Jul. 23, 2007, now Pat. No. 7,408,550.

(60) Provisional application No. 60/833,180, filed on Jul. 24, 2006.

(51) Int. Cl.
*G06T 15/50* (2006.01)

(52) U.S. Cl. .................. 345/426; 345/419; 345/421; 345/423; 345/424

(58) Field of Classification Search ............... 345/419, 345/421, 423, 424, 426
See application file for complete search history.

(56) References Cited

U.S. PATENT DOCUMENTS

| | | | |
|---|---|---|---|
| 5,163,126 A | 11/1992 | Einkauf et al. |
| 5,369,737 A | 11/1994 | Gholizadeh et al. |
| 6,078,332 A | 6/2000 | Ohazama |
| 6,175,367 B1 | 1/2001 | Parikh et al. |
| 6,297,834 B1 | 10/2001 | Malzbender |
| 6,504,538 B1 | 1/2003 | Freund et al. |
| 6,529,193 B1 | 3/2003 | Herken et al. |
| 6,654,013 B1 | 11/2003 | Malzbender et al. |
| 6,839,065 B2 | 1/2005 | Hsu et al. |
| 6,850,244 B2 | 2/2005 | Munshi et al. |
| 7,006,103 B2 | 2/2006 | Horton |
| 7,091,973 B1 | 8/2006 | Cohen |
| 7,106,325 B2 | 9/2006 | Ritter et al. |

(Continued)

OTHER PUBLICATIONS

GPU Gems 2—Chapters 14 and 39. Apr. 2005 (second printing). http://http.developer.nvidia.com/GPUGems2/gpugems2_chapter 14.html http://http.developer.nvidia.com/GPUGems2/gpugems2_chapter39.html.*

(Continued)

*Primary Examiner*—Kimbinh T Nguyen
(74) *Attorney, Agent, or Firm*—Trop, Pruner & Hu, P.C.

(57) ABSTRACT

Frames of image data representative of a scene containing deformable geometry are computed for display on a display device. Frame animation data is computed for a series of frames representative, in animated sequence, of a scene containing deformable geometry. The frame animation data includes a control mesh descriptive of the three-dimensional surface of graphical elements occurring within the scene. Based on the frame animation data, respective illumination values are computed for the individual polygons of the control mesh to determine the global illumination of the scene. The computation is performed iteratively utilizing the directional light functionally emitted from source polygons to receiver polygons to determine global illumination. The directional light emitter values are further utilized, in combination with material properties, specular illumination contributions to the global illumination of the receiver polygons.

20 Claims, 7 Drawing Sheets

U.S. PATENT DOCUMENTS

| | | | |
|---|---|---|---|
| 7,133,041 | B2 | 11/2006 | Kaufman et al. |
| 7,133,052 | B1 | 11/2006 | Silva |
| 7,167,175 | B2 | 1/2007 | Keller |
| 7,167,176 | B2 | 1/2007 | Sloan et al. |
| 7,184,052 | B2 | 2/2007 | Wang et al. |

OTHER PUBLICATIONS

Sloan et al. Precomputed Radiance Transfer for Real-Time Rendering in Dynamic Low-Frequency Lighting Environments. Proceedings of the 29th Annual Conference on Computer Graphics and Interactive Techniques. 2002.*

Daubert et al. Efficient Light Transport Using Precomputed Visibility. IEEE Computer Graphics and Applications. vol. 23. Issue 3. May 2003.*

Tabellion, Lamorlette, An Approximate Global Illumination System for Computer Generated Films, Siggraph 2004 Proceedings (Aug. 2004).

Fatahalian, Real-Time Global Illumination of Deformable Objects, Carnegie Mellon University (May 14, 2003).

Nijasure, Pattanaik, Goel, Interactive Global Illumination in Dynamic Environments using Commodity Graphics Hardware (publication unknown, date unknown).

Perez, Pueyo, Sillion, Global illumination Techniques for the Simulation of Participating Media, (publication unknown, date unknown).

Perez, Global Illumination Techniques for the Computation of High Quality Images in General Environments, University Politecnica de Catalunya, (Sep. 2002).

Funkhouser, Global Illumination, Princeton University (2002).

Longhurst, Debattista, Chalmers, Snapshot: A Rapid Technique for Driving a Selective Global Illumination Renderer, WSCG 2005 Short Papers Proceedings (Jan. 2005).

Banks, Rushmeier, Shirley, Course Notes 5: A Basic Guide to Global Illumination, Siggraph 1998 Proceedings (Jul. 1998).

Damez, Dmitriev, Myszkowski, State of the Art in Global Illumination for Interactive Applications and High-Quality Animations, Computer Graphics Forum, vol. 21 (2003), #4.

Engel, Basic Illumination Techniques, IEEE Visualization 2003 Tutorial, VIS/2003.

Ashikhmin, Shirley, An Anisotropic Phong BRDF Model, publication unknown (Aug. 2000).

Jensen, Global Illumination using Photon Maps, Rendering Techniques '96, Proceedings of the 7th Eurographics Workshop on Rendering, pp. 21-30 (1996).

Mitchell, Shading in Valve's Source Engine, Siggraph 2006 Proceedings (2006).

* cited by examiner

US 7,864,177 B2

SYSTEM AND METHODS FOR REAL-TIME RENDERING WITH GLOBAL AND SPECULAR ILLUMINATION

This application is a continuation of application Ser. No. 11/880,658, filed Jul. 23, 2007, now U.S. Pat. No.7,408,550, which claims benefit of U.S. Provisional Application No. 60/833,180, filed Jul. 24, 2006.

BACKGROUND OF THE INVENTION

1. Field of the Invention

The present invention is generally related to the computer graphics rendering of scenes subject to global illumination and, in particular, to the real-time rendering of complex, deformable geometries with global and specular illumination for realistic scene lighting.

2. Description of the Related Art

A key requirement in the realistic rendering of computer generated graphical images is the accurate computation of the interdependent light distribution among the various element surfaces within the image scene. To address the accurate synthesis of scene lighting, various physics-based global illumination techniques have been developed. These techniques, including radiosity, ray tracing, and photon mapping, approach realistic image rendering by directly simulating the physical phenomenon of light distribution within a set three-dimensional environment. Many of the theoretical and practical implementation issues of physics-based global illumination techniques are explored in *Advanced Global Illumination* by Philip Dutre, Philippe Bekaert, and Kavita Bala, A K Peters, Ltd., (July 2003).

The principal limitation of known physics-based global illumination techniques is the computational intensity of the physics-based simulations. The computational requirements of the algorithms implementing the simulations for scenes of even modest complexity well-exceed usable display frame-rates. Trade-offs, such as reducing the simulation accuracy, directly impact the realism of the rendered scene. Other trade-offs, such as pre-computation of light distribution for static elements, have been explored. Unfortunately, all but a small portion of a typical scene has to be statically pre-computed in order to achieve useable frame-rates. This results in quite visible lighting inaccuracies whenever the any dynamic element is repositioned within the overall scene. Even with the substantial improvements in the processing performance of general purpose central processing units (CPUs) and peripheral graphical processing units (GPUs), known physics-based global illumination techniques are conventionally accepted as too computationally expensive achieve real-time rendering of fully dynamic scenes.

Consequently, a need exists for a physics-based global illumination technique that is fully capable of the real-time rendering of fully dynamic scenes.

SUMMARY OF THE INVENTION

Thus, a general purpose of the present invention is to provide an efficient physics-based global illumination technique capable of supporting full scene realistic rendering of complex deformable geometries in real-time.

This is achieved in the present invention by providing for the production of frames of image data representative of a scene containing deformable geometry for display on a display device. Frame animation data is computed for a series of frames representative, in animated sequence, of a scene containing deformable geometry. The frame animation data includes a control mesh descriptive of the three-dimensional surface of graphical elements occurring within the scene. Based on the frame animation data, respective illumination values are computed for the individual polygons of the control mesh to determine the global illumination of the scene. The computation is performed iteratively utilizing the directional light functionally emitted from source polygons to receiver polygons to determine global illumination. The directional light emitter values are further utilized, in combination with material properties, specular illumination contributions to the global illumination of the receiver polygons.

An advantage of the present invention is that the disclosed global illumination technique enables real-time computation of global illumination for realistic rendering of animated scenes, representing substantially to fully deformable geometries, at high frame-rates.

Another advantage of the present invention is that computation of the global illumination physics-based simulation efficiently utilizes a frame-rate synchronous, converging series of passes, where each pass utilizes a unitary computation of light contribution for both reflection and shadowing. Frame-to-frame coherence is exploited for faster convergence to improve computation of global illumination. The global illumination technique also enables an optimally balanced use of central processor and graphics processor resources to obtain real-time rendering of deformable geometries.

A further advantage of the present invention is that the global illumination physics-based simulation utilizes surface feature dependent directional illumination data to enhance surface illumination realism. The directional illumination data is computed in real-time and efficiently encodes normal perturbation surface data to enable the efficient rendering of bump-mapped, normal-mapped, and displacement-mapped global illuminated surfaces.

Still another advantage of the present invention is that the global illumination technique retains full support for bump-mapping, normal-mapping and displacement-mapping. Implementation of a bi-quadratic interpolation of homogenous light and normal values enables efficient rendering of subdivision surfaces in real-time. Catmull-Clark subdivision surfaces are efficiently approximated using Bezier patches to achieve real-time, realistic rendering of deformable geometries.

Yet another advantage of the present invention is that directional surface illumination data can be used in the global illumination technique to realize realistic rendering of illuminated surface material properties, particularly including realistic specular illumination effects.

DETAILED DESCRIPTION OF THE INVENTION

The present invention provides a computer graphics system particularly suited for the real-time rendering of complex deformable geometries subject to global illumination. For purposes of the following discussion, a deformable geometry is understood to encompass an image, or scene, containing multiple graphical elements that, further, may be independently in motion across one or more frames of a real-time progression of the deformable geometry. The qualification of real-time is similarly to be understood as encompassing the rendering of a scene containing significant deformable geometry at frame rates in excess of twenty and, more typically, twenty-five frames per second. Embodiments of the present invention are capable of rendering complex fully deformable animated scenes at sixty frames per second. While high-quality, realistically rendered scenes subject to global illumination can be readily produced using the full complement of techniques encompassed by the present invention, those of skill in the relevant art will readily understand and appreciate that acceptably real-time and realistically rendered scenes can be achieved within suitable operating domains by the restricted or non-use of various combinations of the techniques described herein.

Figure 1:
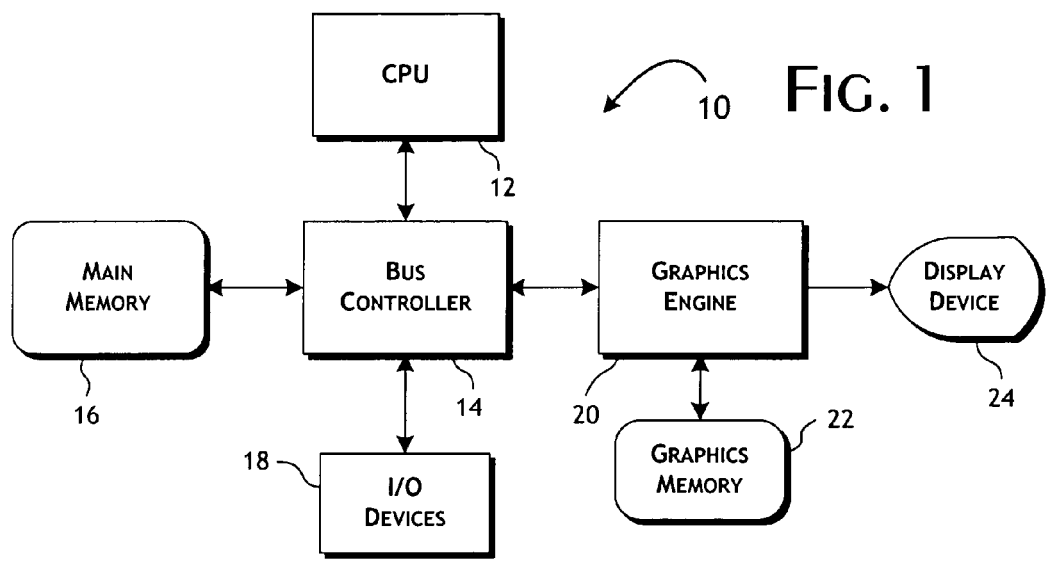
FIG. 1 is a block diagram of a computer graphics display system architecture appropriate for the implementation of a preferred embodiment of the present invention.

A preferred computer system 10 embodiment suitable for implementation of the present invention is shown in FIG. 1. A general purpose central processing unit (CPU) 12 interoperates through a high speed bus controller 14 to access a main memory 16 and manage various input/output (I/O) devices 18. The bus controller also enables command and control of a dedicated graphics processing unit (GPU) 20 by the CPU 12 as well as data transfers between the CPU 12 and GPU 20 and direct memory access transfers to and from the main memory 16. A local high-speed graphics memory 22 provides data storage and support for computational and data intensive GPU 20 operations. Rendered images generated by the GPU 20 are output to a conventional display device 24.

Figure 2:
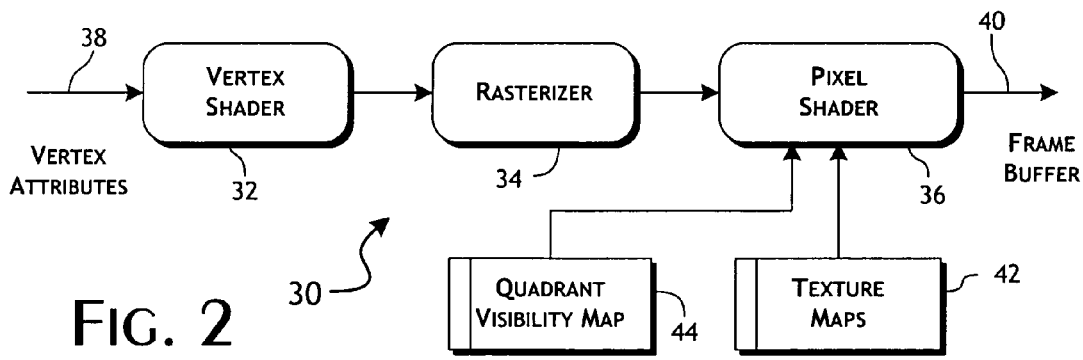
FIG. 2 is a high-level block diagram of a computer graphics rendering pipeline appropriate for use in implementing a preferred embodiment of the present invention.

As illustrated in FIG. 2, within the GPU 20 a graphical data processing pipeline 30, in relevant part, includes a vertex shader 32, rasterizer 34, and pixel shader 36. In summary, the vertex shader 32 operates on vertex attributes 38 that characterize the vertices of the low-resolution mesh representing the elements within the current scene to generate a high-resolution mesh that is then rasterized to generate an image pixel array. The pixel shader operates on each pixel within the array to, in general, apply texture and shading effects in the rendering of the image pixel array to an output frame buffer 40. Depending on the specific implementation of the GPU 20 and size of the graphics memory 22, various texture maps 42 can be uploaded from main memory 16 to the graphics memory 22 and further cached, in whole or in part, within the graphics engine 20 for use on demand depending on the current computational operations required to represent the deformable geometry.

Figure 3A:
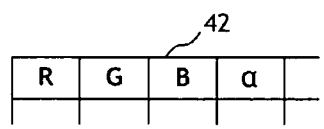
FIGS. 3A and 3B are illustrations of the texture and quadrant visibility map data storage structures used in a preferred embodiment of the present invention.
Figure 3B:
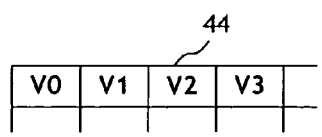

In accordance with the present invention, one or more quadrant visibility maps 44 are also made accessible to the pixel shader 36. In terms of uploading and data management by the graphics engine 20, the quadrant visibility maps 44 are preferably treated as texture maps 42. Quadrant visibility maps 44 differ substantively from texture maps 42 by the nature of the data maintained by the maps. As generally illustrated in FIG. 3A, a texture map 42 conventionally stores a repeating pattern of four 8-bit values, where each quad represents the red (R), green (G), and blue (B) color values and an alpha ($\alpha$) transparency value of a corresponding texel. FIG. 3B illustrates the preferred data content of a quadrant visibility map 44 as containing a repeating pattern of four 8-bit components (V0-V3) where each component represents the percentage of the corresponding quadrant that is visible from the surface at that point.

Figure 4:
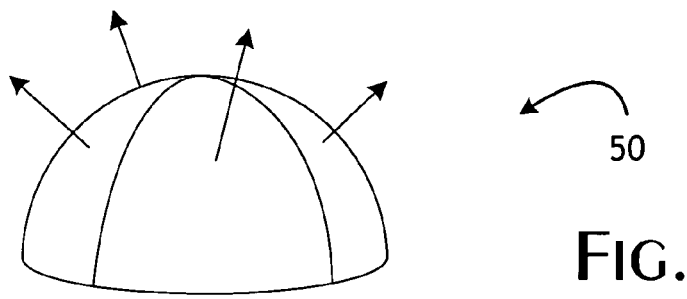
FIG. 4 illustrates a single quad configuration of hemispheric quadrant face centered normals in accordance with a preferred embodiment of the present invention.

The preferred single quad configuration 50 of hemispheric quadrants is illustrated in FIG. 4. For purposes of the present invention, the hemispheric quadrants are centered in the direction of the four vectors N0=(N+$T_1$), N1=(N+$T_2$), N2=(N−$T_1$), and N3=(N−$T_2$), where N is the surface normal and $T_1$ and $T_2$ are orthogonal surface tangent vectors. The quad configuration is preferred as enabling a significantly higher realism to be achieved relative to the required computational overhead incurred. Additionally, conventionally implemented graphics engines 20 provide direct hardware support for memory transfers and operations on quad valued texture maps 42. Other numbers (n≧2) of visibility vectors are contemplated. In particular, a three vector set allows a conditional or other data value to be encoded for each texel. An eight vector set, organized to represent eight hemispheric sections or a two-layer subdivision of four hemispheric quadrants, is also contemplated. Preferably, the vector set can be combinatorically resolved to calculate a perturbed surface normal appropriate for shading operations using conventional lighting calculations, obviating the need for a separate normal, gradient, or bump map. The perturbed surface normal for a quad vector set is determined by:

$$Ns = \text{normalize}(N0 \cdot r + N1 \cdot g + N2 \cdot b + N3 \cdot \alpha) \qquad \text{Eq. 1}$$

where r, g, b, and $\alpha$ are the four components of the quadrant visibility map 44 and N0, N1, N2, and N3 are the four quadrant vectors.

Figure 5A:
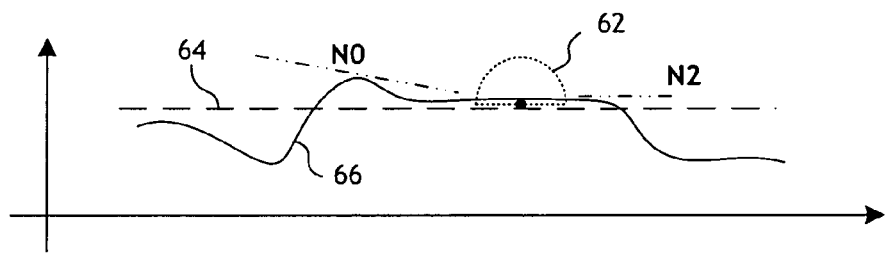
FIGS. 5A and 5B are orthogonal elevation cross-sections of an exemplary graphical scene element as defined in accordance with a preferred embodiment of the present invention.
Figure 5B:
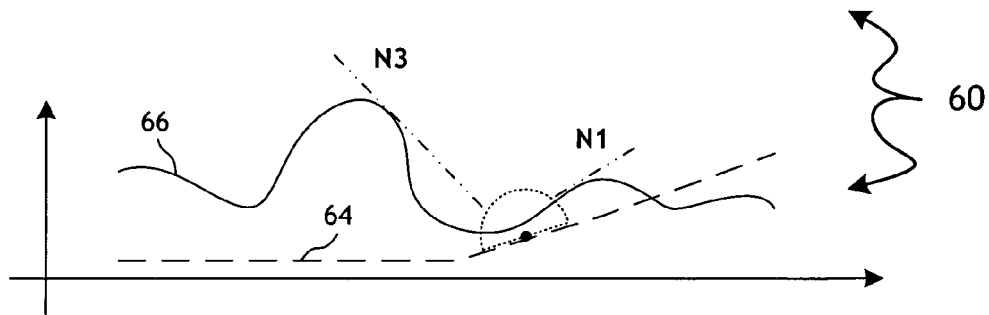

The quadrant visibility map 44 for an element is preferably precomputed based on the relative occlusion of a quadrant as determined from the adjacent surface geometry of the element, in addition to the perturbed normal direction. As illustrated in FIG. 5A, an exemplary first cross-section of an element surface elevation 60 demonstrates occlusion determination relative to a texel 62 defined in relation to a low-resolution element surface 64 and corresponding high-resolution element surface 66. Subject to rotation of the element 64 within the global image space, a small occluding surface feature is associated with the N0 quadrant, while a negligible occlusion occurs for the corresponding N2 quadrant. An orthogonal cross-section of an element surface elevation 60, an illustrated in FIG. 5B, demonstrates a moderate occlusion corresponding to the N1 quadrant and a substantial occlusion of the N3 quadrant.

Figure 6:
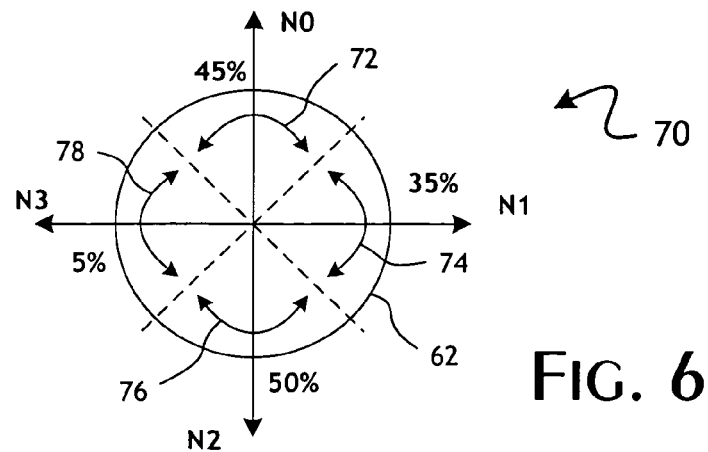
FIG. 6 is a top view of a hemispheric quadrant illustrating the computed illumination of a texel subject to relatively adjacent surface geometry in accordance with a preferred embodiment of the present invention.

The specific degree of occlusion for a particular quadrant can be calculated along the normal lines or, preferably, from a three-dimensional analysis of the surface geometry relative to the quadrants. Preferably, only high-resolution surface geometry in the hemisphere defined above the surface normal of a texel 62 is considered as appropriate to avoid unwanted self-shadowing. As illustrated in FIG. 6, the effects of surface geometry occlusion for the texel 62 are determined for each of the quadrants 72, 74, 76, 78, shown exemplarily as percentage exposure values. Normalized 8-bit representative values are then encoded for the texel into the element corresponding quadrant visibility map 44.

Figure 7:
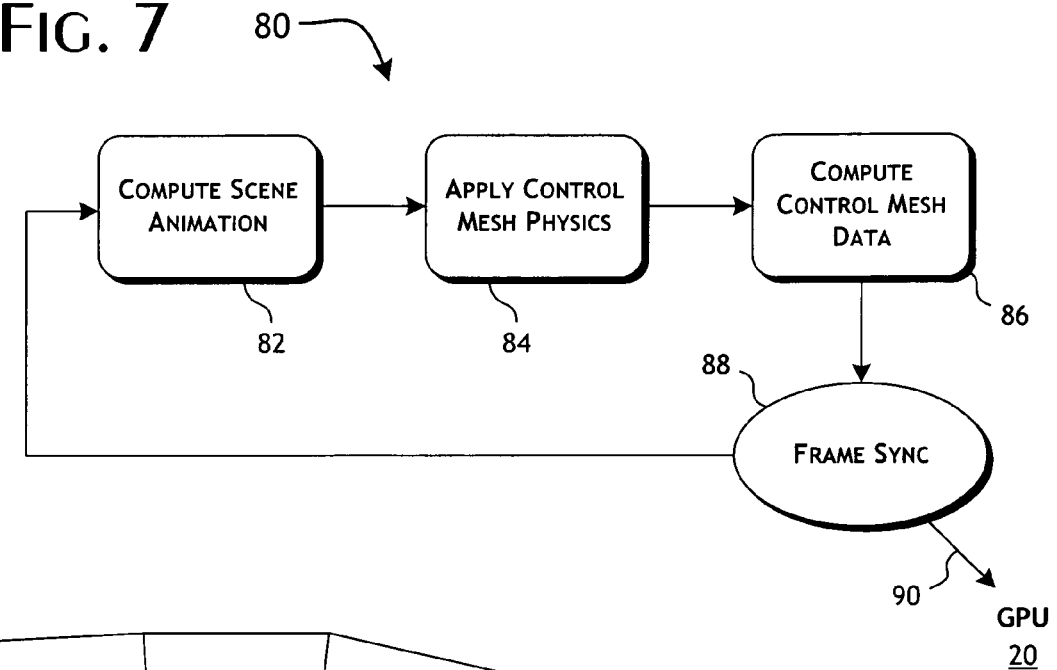
FIG. 7 shows a graphics processing application control flow as executed by a central processing unit in accordance with a preferred embodiment of the present invention.

In accordance with the present invention, real-time rendering of complex deformable geometries subject to global illumination is performed using combined computational capabilities of the CPU 12 and GPU 20. High-level animation processing is performed through the execution of a graphics processing application on the CPU 12, while the comparatively low-level global illumination and related pixel shading operations are performed on the GPU 20. As generally illustrated in FIG. 7 by the graphics processing application control flow 80, animation processing is performed iteratively on a frame-by-frame basis. Within each frame animation iteration, the dynamic animation of the deformable geometry elements within the scene is computed in a conventional manner 82 to define the vertex positions of the control mesh for the elements within the scene. The control mesh vertex positions may then be further modified 84, typically determined by physics-based simulation such as arising from element interactions. A vertices data set representing the control mesh vertices is then generated or updated 86 typically in main memory 16. The vertices data set is held in main memory 16 pending the GPU 20 performing a frame synchronization 88 where a direct memory access transfer copies 90 the vertices data set to the graphics memory 22.

Figure 8:
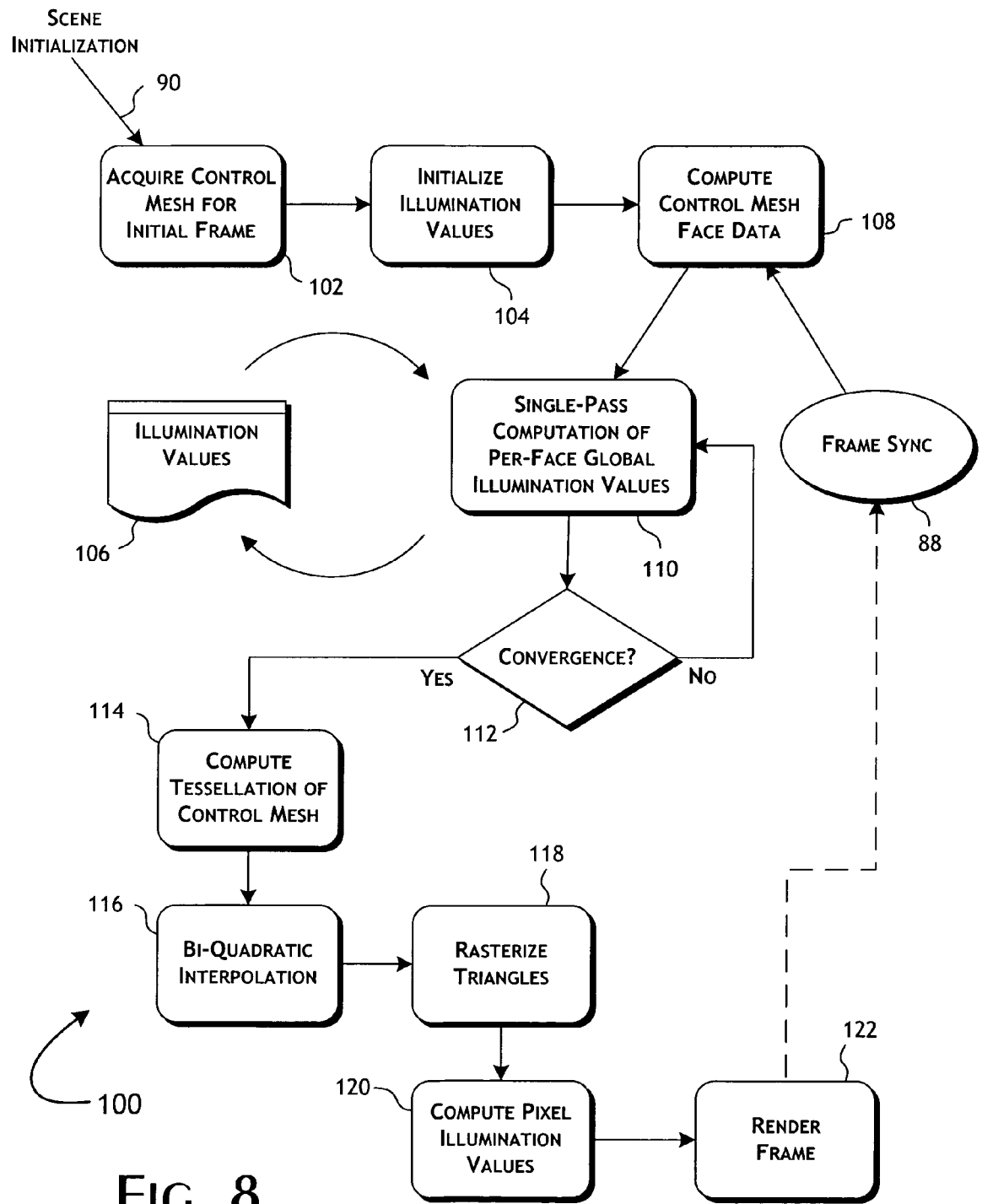
FIG. 8 shows a rendering control flow as executed by a graphical processing unit in accordance with a preferred embodiment of the present invention.

In preferred implementations of the present invention, the graphics processing application control flow 80 executes as a parallel pipeline a frame in advance of the frame being rendered by the GPU 20. The preferred rendering control flow 100 executed on the GPU 20, generally as shown in FIG. 8, acquires 102 an initial vertices data set 90, representing the initial scene image. For purposes of computing global illumination in accordance with the present invention, an illumination table 106 is constructed to contain an illumination value for each polygon surface within the control mesh. In the presently preferred embodiments, the illumination table 106 is structured for manipulation by the GPU 20 as a texture map 42 instance. The illumination table 106 is initialized 24 with active glow surfaces set to corresponding, animation determined positive constant values and passive surfaces set to a zero illumination value.

The vertices data set is then processed 108 to produce a face data set that incorporates, based on the provided control mesh vertex locations within the global image space, the centerpoint of each polygon, or face, and corresponding polygon areas, and the normal and tangent surface vectors for each polygon. A single pass computation of polygon surface illumination values is then performed 110, with the illumination results being recorded in an illumination values table 106. The single pass computation 110 is repeated 112 until a qualified convergence is obtained. Qualified convergence may be determined where the change in the illumination table values is less than a defined threshold, considered globally, for statistically selected polygons, or a subset of polygons chosen based on a defined viewpoint. Preferably, the number of iterations to reach convergence is either capped or simply set to a fixed number. In presently preferred embodiments, convergence iterations for an initial scene is capped at five and subsequent convergence iterations are fixed at one. The cap limit of five initial iterations has been empirically determined to achieve a sufficient degree of realism for a single initial frame in typical application. By utilizing frame-to-frame coherence in the production of illumination table values, in accordance with the present invention, the cap limit of one iteration per frame in ongoing use is not a functional limit on convergence. Rather, the preferred use of frame-to-frame coherence results in an effectively infinite iteration convergence series that will tend to improve in accuracy with increasing frame rates.

Once qualified convergence 112 has been achieved, a final tessellation of the control mesh is computed 114 using, for example, a conventional Catmull-Clark subdivision algorithm. An improved and preferred bi-quadratic, rather than conventional bi-linear, illumination distribution algorithm is then used 116 to determine the functional reflectance of incident light over the individual subdivision surfaces. The subdivision surfaces are then further conventionally reduced, as required, to triangles that are then rasterized 118 to produce an image pixel array. Illumination values for the individual pixels are then computed 120 and the rendered image frame 122 is then released to the frame buffer for display 24. Finally, dependent on frame-rate timing, the GPU 20 will perform a frame synchronization 88 to retrieve a next vertices data set 90, representing the next animated frame image to be iteratively rendered.

In accordance with the present invention, each iterative execution of the single-pass computation of polygon surface illumination values 110 operates to estimate the total amount of light that reaches the center of each polygon in the control mesh of the elements within the current scene from every other polygon. The single-pass computation technique is an improvement over the diffuse light transport system introduced in Chapter 14: Dynamic Ambient Occlusion and Indirect Lighting (Michael Bunnell) of GPU Gems 2, Addison-Wesley, 2005. While the prior light transport system requires a discrete light distribution pass followed by multiple shadowing passes to calculate each bounce of indirect light, the present single-pass computation technique advantageously incorporates both lighting and shadowing value contributions, allowing a computationally efficient single-pass summation operation over the set of polygons defined by the control mesh.

In each iteration, the incident light estimate for a given polygon is the sum of the light radiated by active glow polygon surfaces, representing area lights, that shine on the polygon, the light reflected onto the polygon from other illuminated polygons, and occluded light from shadowing polygons. Radiated and reflected light represent positive illumination contributions, while the occluded light is treated as a negative contribution. Each single-pass computation of polygon surface illumination values 110, in accordance with the present invention, encompasses both radiative and occlusive lighting effects. By the iterative updating of the illumination values table 106, the contributions of multiple light bounces are accumulated.

To compute the incident illumination for a receiver polygon from an emitter polygon, a variation of the form factor for disk to disk radiance transfer approximation is preferably used. Given that V is a vector from the center of a receiver polygon to the center of an emitter polygon, A is the area of the emitter polygon, $N_E$ is the normalized normal of the emitter polygon and $N_R$ is the normalized normal of the receiver polygon, the radiance form factor F is given as:

$$F = \left| \frac{A(N_E \cdot V)(N_R \cdot V)}{\pi(V \cdot V) + A} \right| \qquad \text{Eq. 2}$$

The normal of a quadrilateral polygon with vertices v0, v1, v2, v3 can be calculated using the cross product:

$$N = (v1-v0+v2-v3) \times (v3-v0+v2-v1) \qquad \text{Eq. 3}$$

The same equation can be used for triangular polygons by using v0 in place of v3. The area A is the length of the normal:

$$A = \sqrt{N \cdot N} \qquad \text{Eq. 4}$$

The amount of light $L_R$ that reaches the center of a receiver polygon is computed as:

$$L_R = \sum_{all\ E} \begin{cases} F * G_E * C_E & G_E > 0 \\ F * L_E * C_E & N_E \cdot V < 0 \\ -F * L_E & N_E \cdot V \geq 0 \end{cases} \qquad \text{Eq. 5}$$

where all E is the set of all polygons in the control mesh exclusive the receiver polygon for which the light value $L_R$ is being computed, $G_E$ is the glow intensity of an emitter polygon, provided the emitter polygon is part of an area light, $C_E$ is the color of the emitter polygon, $L_E$ is the estimated amount of light received by the emitter polygon as determined from the immediately prior iteration or zero in the absence of a prior iteration, provided the emitter polygon is a reflective surface, and $L_E$ and $L_R$ each have red, green, and blue color components appropriate to support colored light and surfaces. Where the emitter polygon faces away from the receiver polygon, the receiver polygon is considered to be shadowed by the emitter polygon. The light contribution of the emitter polygon is summed as a negative light value. Negative component illumination values of $L_R$ are clamped to zero.

Figure 9:
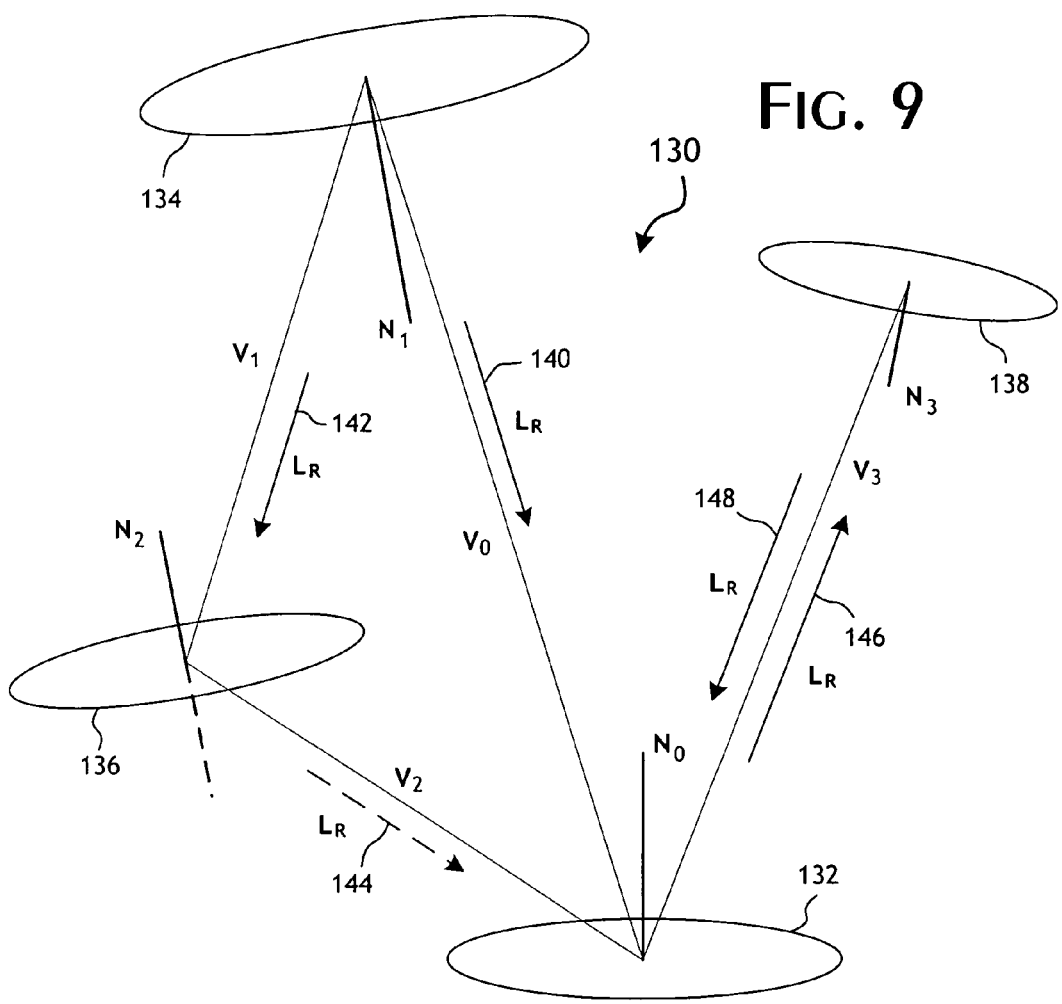
FIG. 9 is an illustration of the polygon illumination relationships handled in by the single-pass computation of polygon surface illumination values in accordance with a preferred embodiment of the present invention.

FIG. 9 provides an exemplary illustration 130 of the polygon illumination relationships handled in by the single-pass computation of polygon surface illumination values 110. As shown, a receiver polygon represented by the area 132 is actively illuminated by a fixed glow intensity polygon emitter, represented by the area 134, shaded by a polygon emitter area 136, and passively illuminated by a polygon emitter area 138. For a given iteration of the single-pass computation polygon surface illumination values 110, the illumination values of the emitter areas 134, 136, 138 are set to the values determined in the prior iteration. For an initial frame, the prior values are zero. For a first iteration for a subsequent frame, the prior values are the final illumination values determined for the immediately prior frame. Where multiple iterations are preformed against a single frame, the prior iteration illumination values are preferably updated only once the current iteration is complete.

For the exemplary configuration shown in FIG. 9, the current iteration illumination value computed for the area 132 will be the sum of $L_R$ 140, $L_R$ 144, and $L_R$ 148. For the initial iteration for an initial frame, the illumination value of the area 132 will be equal to $L_R$ 140. In this iteration, the contributions $L_R$ 144, and $L_R$ 148 to the area 132 are zero since the corresponding emitter areas 136 and 138 are passive. The illumination value of area 136, however, will be $L_R$ 142, while the illumination value of area 138 will remain zero since the area 132 also acts as a passive emitter. In the next iteration, a negative illumination value $L_R$ 144, with a magnitude is dependent on $L_R$ 142, is contributed by the area 136. The negative illumination value $L_R$ 144 is further preferably spread equally across the color components as an appropriate representation of shadow. The illumination value of area 138 becomes non-zero, due to a non-zero $L_R$ 146 having a magnitude dependent on the prior iteration illumination value of the area 132. In subsequent iterations, the illumination values of areas 132 and 138 will converge to respective values based on the relative exchange of incident light $L_R$ 146 and $L_R$ 148.

Animation of the deformable geometry within a scene results in a translation of the control mesh polygons. In accordance with the present invention, frame-to-frame coherence of polygon illumination values is utilized in computing the polygon surface illumination values. The prior frame illumination values are a sufficiently close approximation of the true fully shaded illumination values, convergence is realized with a single iteration of the single-pass computation of polygon surface illumination values 110. Where convergence is not realized on a single iteration, convergence is typically achieved over the course of a few frames or is of reduced practical importance due to the translation speed of the relevant element.

The single-pass computation of polygon surface illumination values 110, as so far described, determines the global illumination light intensity values for hemispheres defined against the polygons of the control mesh. In accordance with the present invention, the computation of light intensity values is extended, still fully within the framework of a single-pass computation, to support directional shading of pixels for increased realism. Preferably, computation of a uniformly distributed set of directional light intensity values ($n \geq 2$) for each hemisphere provides a representation of the directionally varying incidence of illumination. Preferably, the number of directional light intensity values and the number of visibility values stored in a corresponding visibility map 44 are equal. In the preferred embodiments of the present invention, the illumination values table 106 is preferably structured to hold four quadrant illumination values, with each quadrant illumination value being represented as a combination of three color component values. The total illumination received by a polygon can be computed as an average of the four quadrant illumination values stored for that polygon.

The four quadrant illumination values, L1, L2, L3, and L4, are determined based on the orientation of the quadrant centered vectors relative to a polygon surface tangent space. A tangent vector for a polygon is computed perpendicular to the polygon normal based on the tangent space coordinates, also referred to as the texture coordinates, of the polygons vertices. In conventional computer graphics uv mapping terminology, the tangent vector corresponds to the vector (1, 0) translated to 3D space. For a polygon with vertex positions of v0, v1, v2, and v3 and u tangent space coordinates of u0, u1, u2, and u3, both listed in clockwise order, the tangent vector is computed as:

$$T = v0(2u0-u3-u1)+v1(2u1-u0-u2)+v2(2u2-u1-u3)+v3(2u3-u0-u2) \qquad \text{Eq. 6}$$

The tangent vector for a triangular polygon can be computed also by using Equation 6 where the vertex value v3 is set to v0 and the texture space coordinate of u3 is set to u0.

To compute the four quadrant light values the total light value is modulated by the cosine of the angle between the vector from the receiver face center and the emitter face center and the four quadrant direction vectors, which are specified as:

$$Q_1 = N_R + T_1 \quad \text{Eq. 7}$$

$$Q_2 = N_R + T_2 \quad \text{Eq. 8}$$

$$Q_3 = N_R - T_1 \quad \text{Eq. 9}$$

$$Q_4 = N_R - T_2 \quad \text{Eq. 10}$$

where $T_1$ is the polygon tangent vector and $T_2$ is the binormal tangent vector ($N_R \times T_1$).

The form factor F is calculated according to Equation 2. Given that active and passive emitter polygons are diffuse emitters, the estimated light $L_E$ received from an emitter polygon is computed as the average of the L1, L2, L3, and L4 values determined from the immediately prior iteration or zero in the absence of a prior iteration. The light received by a receiver polygon is then computed as:

$$L(E) = \begin{cases} F * G_E * C_E & G_E > 0 \\ F * L_E * C_E & N_E \cdot V < 0 \\ -F * L_E & N_E \cdot V \geq 0 \end{cases} \quad \text{Eq. 11}$$

The individual quadrant components L1, L2, L3, and L4 of the total received light, repeated as appropriate for each color component, are then computed as:

$$L_1 = \sum_{all\ E} L(E) \min(\max(V \cdot N + V \cdot T_1, 0), 1) \quad \text{Eq. 12}$$

$$L_2 = \sum_{all\ E} L(E) \min(\max(V \cdot N + V \cdot T_2, 0), 1) \quad \text{Eq. 13}$$

$$L_3 = \sum_{all\ E} L(E) \min(\max(V \cdot N - V \cdot T_1, 0), 1) \quad \text{Eq. 14}$$

$$L_4 = \sum_{all\ E} L(E) \min(\max(V \cdot N - V \cdot T_2, 0), 1) \quad \text{Eq. 15}$$

The resulting three color component values for each of the quadrant intensity values are saved to the illumination values table 106. As can be appreciated, minimal added computation cost is incurred in determining the four quadrant intensity values relative to computing a single non-directional light intensity value.

Once incident lighting values for all polygons in the control mesh defining the current scene are computed, the polygons can be rendered. Various conventional shading methods can be applied in the rendering process. For a simple flat diffuse shading, the color shading of a polygon can be determined as the product of the light value polygon color, or texture color if the polygon is texture mapped. Alternatively, per-vertex light values can be computed by averaging the light values of adjacent polygons that share vertices. This will allow conventional application of Gouraud and Phong shading techniques.

In accordance with the present invention, an improved illumination intensity bi-quadratic technique over subdivision surfaces is preferred as generally computationally efficient while achieving greater accuracy in the shading of complex surfaces. While preferred for use in combination with the directional lighting techniques described above, the bi-quadratic technique is also fully capable of use in systems where only a single light value, composed of three color components, is defined for each texel.

Figure 10:
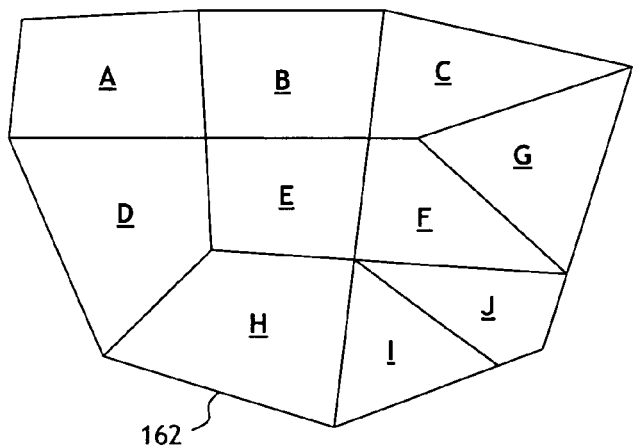
FIG. 10 shows a portion of a control mesh used in conjunction with preferred embodiments of the present invention.

Referring to FIG. 10, the preferred bi-quadratic technique is applied to a control mesh that has been tessellated 114, preferably through Catmull-Clark subdivision, to achieve a refined control mesh 162 consisting of quadrilaterals and triangles. To determine the distribution of light across the control mesh, the polygon light values are converted to a homogeneous coordinate system by weighting the light color component values of each polygon by the area of the polygon and treating that area as an extra light component. For the preferred embodiments, the illumination values table 106 will then store, for each polygon in the control mesh, four directional light values, L1, L2, L3, and L4, that each contain three color component values.

Figure 11:
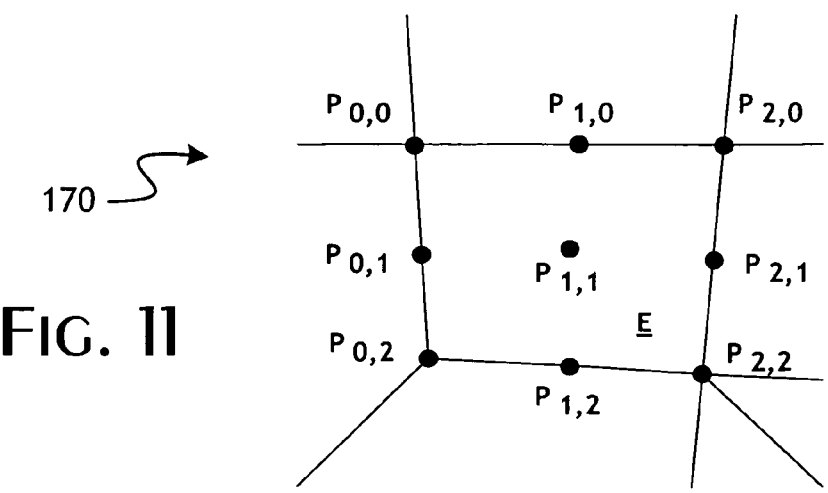
FIG. 11 illustrates an exemplary control mesh polygon with interpolation control points as used in conjunction with a preferred embodiment of the present invention.

Light values for each vertex in the polygon mesh are then calculated. Preferably, the light value for a given vertex is computed as the average of the light values associated with the polygons that share the vertex. Considering the polygon E, further shown in detail in FIG. 11, the exemplary vertex point $P_{0,0}$ is shared with polygons A, B, D, and E. Where the polygon light values include directional light values, the commonly ordered directional light values are averaged together. Light values for each edge are similarly calculated by averaging the light values of the faces that share the edge. Thus, for each quadrilateral, nine light values, representative of the points $P_{0,0}$-$P_{2,2}$, serve as the coefficients in the parametric equations used to solve for the light value at any point in that portion of the surface. The quadratic Bezier basis functions are used to solve for any u, v coordinate Q(u, v) on the face of a quadrilateral:

$$B_{i,2}(t) = 2t^i(1-t)^{2-i}/i!/(2-i)! \quad \text{Eq. 16}$$

where i is the row or column of the control point, and t is the u or v coordinate (range 0 to 1).

$$Q(u, v) = \sum_{i=0}^{2} \sum_{j=0}^{2} P_{i,j} B_i(u) B_j(v) \quad \text{Eq. 17}$$

where Q(u,v) represents the incident light intensity at the polygon surface coordinates u, v.

The three color components of the light value are then divided by the area component after biquadratic interpolation to determine the light value used for shading.

Triangles are treated similar to quadrilaterals subject to being defined by seven, instead of nine, control points. In accordance with the present invention, the light values at any point in the triangle can be computed using analogous Bezier triangle interpolation methods, again treating the light values as if they were control points. Conventional techniques can be used to convert a quadratic Bezier triangle to a Bezier patch and separately to perform bi-quadratic interpolation for evaluation.

In accordance with the present invention, a number of further computational efficiencies can be realized. First, a significant computational efficiency can be obtained by approximating subdivision surface normals, rather than explicitly computing actual normals. Preferably, the subdivision surface normals are approximated using bi-quadratic interpolation of the polygon normals similar in manner as used to approximate the vertex and edge light values. As with the interpolated light values, each normalized polygon normal is preferably scaled by the area of the polygon before interpolation. Before use in the surface shader, the interpolated result is preferably normalized by division by the length of the normal, rather than by dividing by the polygon area obtainable as fourth component of the associated light value.

Another computational efficiency can be realized by using Bezier patches as a substitute representation of the Catmull-Clark subdivision surfaces. Given that, in accordance with the present invention, the polygon surface normals and associated light values are smoothly interpolated, the conventional continuity problems introduced by approximating subdivision surfaces of arbitrary topology with Bezier patches will not visible. Points on Bezier patches can be computed more efficiently than subdivision surfaces.

Figure 12A:
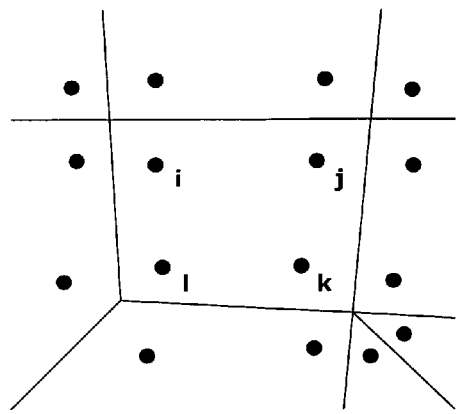
FIG. 12 illustrates an exemplary control mesh polygon with bi-cubic Bezier control points as used in conjunction with a preferred embodiment of the present invention.

The preferred process of computing bi-cubic Bezier patches is illustrated in FIGS. 12A-12D, with exemplary reference to the E designated polygon of the control mesh section 160. As indicated in FIG. 12A, the initial step in computing the bi-quadratic Bezier patches is to calculate an inner control point for each vertex of each polygon, shown as control points i, j, k, and l for polygon E. The control points are calculated as a weighted sum of the vertices of the polygon. Thus, the control point locations (CP) for a quadrilateral are defined as:

$$CP_i = W_p P_{0,0} + W_q P_{2,0} + W_r P_{0,2} + W_s P_{2,2} \qquad \text{Eq. 18}$$

$$CP_j = W_p P_{2,0} + W_q P_{2,2} + W_r P_{0,0} + W_s P_{0,0} \qquad \text{Eq. 19}$$

$$CP_k = W_p P_{0,2} + W_q P_{0,0} + W_r P_{2,0} + W_s P_{2,2} \qquad \text{Eq. 20}$$

$$CP_l = W_p P_{2,2} + W_q P_{0,2} + W_r P_{0,0} + W_s P_{2,0} \qquad \text{Eq. 21}$$

where the vertex oriented weighing masks ($W_x$) used to approximate the Catmull-Clark subdivision surfaces for a quadrilateral are defined as:

$$W_p = \frac{v}{v+5} \qquad \text{Eq. 22}$$

$$W_q = \frac{2}{v+5} \qquad \text{Eq. 23}$$

$$W_r = \frac{2}{v+5} \qquad \text{Eq. 24}$$

$$W_s = \frac{1}{v+5} \qquad \text{Eq. 25}$$

where v represents the valence of the vertex of the control point being computed and where the valence of a vertex is defined as the number of polygons sharing the vertex.

For a triangle, the vertex oriented weighting masks ($W_x$) are defined as:

$$W_p = \frac{v}{v+4} \qquad \text{Eq. 26}$$

$$W_q = \frac{2}{v+4} \qquad \text{Eq. 27}$$

$$W_r = \frac{2}{v+4} \qquad \text{Eq. 28}$$

For a boundary vertex with valence three, occurring where a vertex has one or more edges not shared by two polygons, the vertex oriented weighting masks ($W_x$) are defined to place the boundary edge associated inner control points on the edge. Where both edges sharing a vertex are not shared by another face, then the vertex oriented weighting masks ($W_x$) are $W_p=1$, $W_q=0$, $W_r=0$, and $W_s=0$ (for quads). Where the unshared edge is between the vertices corresponding to $W_s$ and $W_p$, then the vertex oriented weighting masks ($W_x$) are $W_s=\frac{2}{3}$, $W_p=\frac{1}{3}$, $W_q=0$, and $W_r=0$ (for quads). Where the unshared edge is between the vertices corresponding to $W_s$ and $W_q$, then the vertex oriented weighting masks ($W_x$) are $W_s=\frac{2}{3}$, $W_p=0$, $W_q=\frac{1}{3}$, and $W_r=0$ (for quads). As with quadrilaterals, the control point locations for triangles and boundary points are computed as weighted sums of the applicable vertices.

Figure 12B:
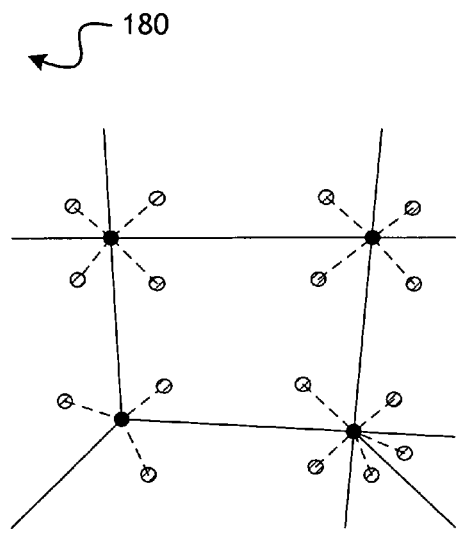
Figure 12C:
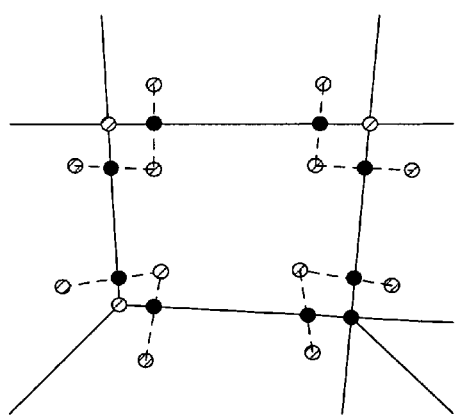
Figure 12D:
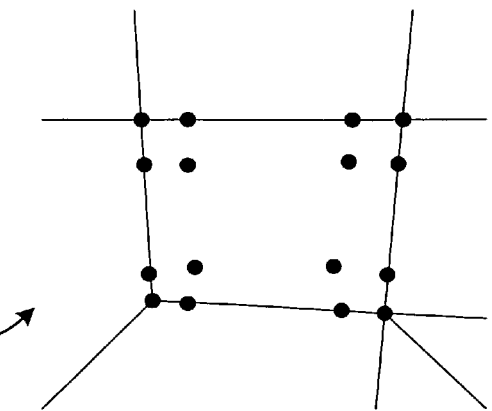

Once the inner control points are determined, corner control points are computed for each of the vertices in the control mesh 162, as generally shown in FIG. 12B. The corner control points are computed as the average location of the inner control points that correspond to the associated vertex. As shown, one inner control point of each polygon that shares a vertex is defined as corresponding to the associated vertex. As generally shown in FIG. 12c, two control points are then computed for each polygon edge. These edge control points are preferably determined by averaging the two nearest opposing control points occurring in edge adjacent polygons and corresponding to the associate vertex. If the edge is unshared, the value of corresponding inner control point is used for the edge control point also.

Figure 13:
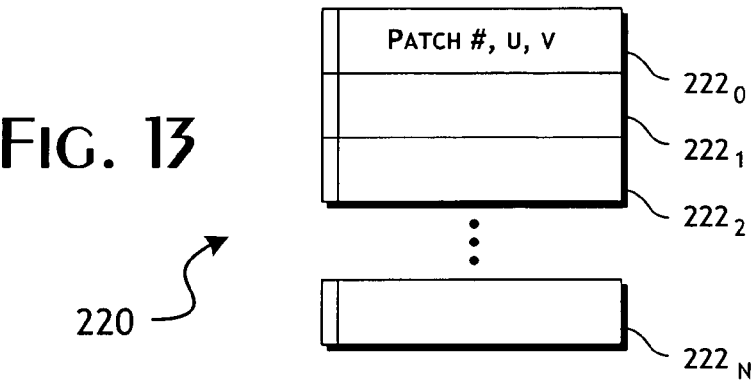
FIG. 13 provides a representation of a Bezier patch coordinate data structure as used in conjunction with a preferred embodiment of the present invention.

The computed control points are then collected to form sets of bi-cubic Bezier patches. Preferably, the Bezier patches are collected into a data structure 220, generally as illustrated in FIG. 13. Each patch $222_{0-N}$ preferably contains a unique patch number and ordered sequence of the u, v coordinate values that define the control points of the corresponding Bezier patch approximated subdivision surface polygon. For quadrilaterals, sixteen control point coordinates, corresponding to the four inner control points, four corner control points, and eight edge control points, are stored as a discrete patch $222_{0-N}$. For triangles, an additional center control point is computed to define a Bezier triangle. The center control point is defined as the average of the three inner control points. The resulting collection of ten control points coordinates, corresponding to the three inner control points, three corner control points, six edge control points, and one center control point, are stored as a discrete patch $222_{0-N}$.

Figure 14A:
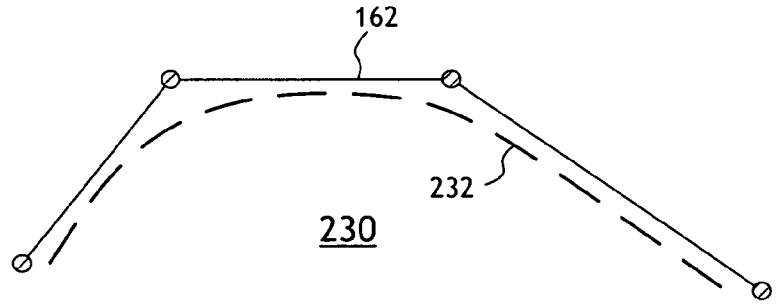
FIGS. 14A and 14B illustrates bi-cubic and bi-quadratic interpolation light intensity distribution functions as used in conjunction with a preferred embodiment of the present invention.
Figure 14B:
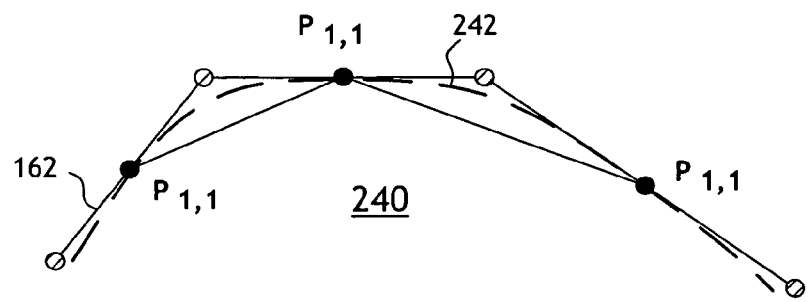

The bi-cubic Bezier patch data can then be used in the computation of vertex positions on the limit surface defined by the control mesh 162. As generally illustrated by the elevation cross-section 230 shown in FIG. 14A, conventional un-weighted interpolation, utilizing vertex normals, provides a relatively uniformly graded light distribution 232 over the surface of the control mesh 162. In accordance with the present invention, the preferred bi-quadratic interpolation of light intensity distribution over the equivalent cross section 240 shown in FIG. 14B is computed based on the Bezier patch $222_{0-N}$ control point data. As illustrated, the graded light distribution 242 is realized with greater conformance to the underlying control mesh form weighted, in part, on the relative area of the adjacent polygons.

In accordance with the present invention, the interpolation determination of light intensity values over the control mesh surface utilizes visibility map 44 information in order to determine the illumination of each pixel in the pixel array produced by rasterization 118. Since, in the preferred embodiments the quadrant visibility maps 44 are implemented as texture maps, the 3D coordinate space orientation of the pixel associated polygons and the texture space of the visibility values must be aligned. Specifically, the four light values must be rotated as needed so that adjacent polygons that do not share texture coordinates can share light values. Rotations of integer multiples of 90 degrees are straightforward. To achieve a 90-degree clockwise rotation, the order of the incident quadrant light values can be shifted so that, for a value set of a, b, c, d, the rotated value set becomes b, c, d, a. Fractional rotations, where the rotation angle/90≠0, are preferably implemented by linear interpolation. Again using the values set a, b, c, d, a counter clockwise rotation of 22.5 degrees is computed as 0.75a+0.25b, 0.75b+0.25c, 0.75c+ 0.25d, 0.75d+0.25a.

Calculating the angle of rotation for light values is performed by comparing texture coordinates of edges shared in 3D space. The angle of an edge in texture space can be computed as a tan 2(v1-v2, u1-u2), where (u1,v1) and (u2,v2) are the texture coordinates of the edge's vertices. The angle used to rotate the light value across an edge shared by two faces is the edge angle of the first face minus the edge angle of the second face. If the result is negative, then 360 degrees is added to force a positive result. In the case where polygons share a vertex, but not an edge, the necessary rotation angle can be determined by visiting the polygons around the edge in order and summing their rotation angles. For example, if polygons A, B, C, D and E, (listed in clockwise order) share a vertex, a clockwise rotation angle for C with respect to A can be found by adding the angle for B with respect to A and the angle of C with respect to B. To minimize the effects of minor mesh discontinuities and rounding errors, a different angle of rotation may be determined by summing angles counter clockwise. That is, by summing the angle of E with respect to A plus the angle of D with respect to E plus the angle of C with respect to D. The final angle of rotation for C with respect to A is preferably computed by averaging the clockwise and counter-clockwise 12 angles.

To finally compute the pixel shading of the polygon mesh, the incident light values are combined with applicable texture map 42 values and quadrant visibility map 44 values. For the preferred four component light values, the shading equation for computing the diffuse light for the surface becomes:

$$I = L1*s1 + L2*s2 + L3*s3 + L4*s4 \quad \text{Eq. 29}$$

where L1, L2, L3, and L4 are the four quadrant light values, each containing three color components, and s1, s2, s3, and s4 are the four components of an illumination map texture value.

The values in the illumination map can be pre-computed from an otherwise conventional normal map using the following conversion where $N_x$, $N_y$, and $N_z$ are the three components of the normal and $I_n$ is $n^{th}$ component (n=1, 2, 3, or 4) of the illumination texture. For each entry in the illumination map, the illumination value is initially set to zero for all quadrants. The two closest quadrants of the hemisphere pointed to by the normal using the x and y components of the normal and the arctan 2 function, which functions like arctangent, but takes two parameters and returns a result (a) within the range of −PI to PI.

$$a = \frac{2}{\pi}\arctan 2(N_y, N_x) \quad \text{Eq. 30}$$

The result (a) is then normalized by multiplication by a 2/PI factor. An integer value of four is added if the normalized value is negative. The result (a) will now be within a range of between zero and four. The integer part of the result (a) is used to select the two closest quadrants and the fractional part of to set their illumination values. The two quadrants selected are specified by the functions floor(a) and ((floor(a)+1)modulo 4). The illumination values set for these two quadrants are specified by the functions 1-frac(a) and frac(a), respectively. Finally, the $N_z$ normal component is used to compute the incident illumination angle relative to the polygon surface.

$$z = \frac{2}{\pi}\arcsin(N_z) \quad \text{Eq. 31}$$

The illumination angle (z), as defined within a range of zero to one, functions to specify the percentage of incident illumination that would reach an unperturbed surface. The adjusted incident illumination value ($I_{n'}$) for each quadrant is then computed as:

$$I_{n'} = (1-z)I_n + \frac{z}{4} \quad \text{Eq. 32}$$

In accordance with the present invention, the quadrant visibility map values, representing incident illumination occlusion scaling values, are then applied to determine a final visibility value ($I_{n''}$). In effect, the occlusion values adjust the shading to account for the surface self-shadowing that would be imposed by the high-resolution surface geometry.

$$I_{n''} = I_{n'} q_n \quad \text{Eq. 33}$$

where $q_n$ is the quadrant visibility value component aligned with the incident illumination value $I_{n'}$.

In accordance with the present invention, a separate normal map is not required as the illumination map can be used to reconstruct the conventional shading normal. Specifically, the shading normal can be computed from the illumination map values as:

$$Ns = \text{normalize } ((N+T_1) \cdot r + \\ (N+T_2) \cdot g + \\ (N-T_1) \cdot b + \\ (N-T_2) \cdot \alpha) \quad \text{Eq. 34}$$

where r, g, b, and α are the four components of the quadrant visibility map 44, N is the polygon centered surface normal, and $T_1$ and $T_2$ are the orthogonal polygon surface tangent vectors.

In accordance with the present invention, specular effects arising from global illumination can be implemented through use of the directional light values. Many materials have a specular property, also referred to as shininess, that represents a directionally dependent light reflectivity. With respect to the realistic rendering of a deformable geometry, the amount of light reflected from the different texels of the included elements toward a viewer must change with changes in the view direction.

In order to approximate the specular property of illuminated texels, the directionally incident light values, as computed in determining the illumination of the individual texels, are further functionally treated as separate directional lights. Four separate reflection vectors, corresponding to the light direction vectors, are each calculated as:

$$R = 2(Ns \cdot L)*Ns - L \quad \text{Eq. 35}$$

where Ns is the shading normal, and L specifies a respective light direction vector selected from the set of vectors defined by $N+T_1$, $N+T_2$, $N-T_1$, and $N-T_2$ in the preferred embodiments of the present invention.

Preferably, a conventional Phong reflection model is then used to compute the specular term for each of the four lights.

The four specular components of the Phong reflection model are preferably computed as:

$$S = LKS_m \max((R \cdot V), 0)^n \qquad \text{Eq. 36}$$

where L is the light value three component light intensity value, K is the specular intensity defined for the material, $S_m$ is the defined specular color of the material, R is the reflection vector, V is the vector from the surface to the viewer, and n is the defined shininess of the material.

The specular intensity can be selectively modified to improve the apparent specular realism of the material. Specifically, the specular term K can be multiplied by a Fresnel attenuation factor to attenuate the reflection. This modification is preferred for rendering material surfaces that are not purely metallic, and particularly for plastic and cloth. The Fresnel attenuation factor is computed as:

$$F = K_{min} + (K - K_{min}) * \text{pow}(1 - |NS \cdot E|, F_e) \qquad \text{Eq. 37}$$

where $K_{min}$ is a minimum specular reflection value defined for the material, K is the unmodified reflection intensity, Ns is the shading normal, E is the normalized vector from the surface to the viewer, and $F_e$ is the Fresnel exponent defined as a material property of the surface.

The four specular components are then computed as:

$$S = LFS_m \max((R \cdot V), 0)^n \qquad \text{Eq. 38}$$

The individual specular terms, once determined, are then summed together to define a specular contribution component that is added to the applicable pixel illumination values to obtain a final shading result.

Thus, techniques that enable real-time rendering of deformable geometry subject to global illumination and further improve upon the realism achieved in the scene rendered have been described. While the various rendering techniques disclosed are advantageously used together, various subcombinations will be useful in differing circumstances. Therefore, within the scope of the appended claims, as understood in view of the above description of the preferred embodiments of the present invention, subject to modification and variation of a scope readily appreciated by those of skill in the art, the invention may be practiced otherwise than as specifically described above.

The invention claimed is:

1. A method, implemented within a computer system including a graphics rendering subsystem, providing for the production of image data representative of a scene containing defined elements for display on a display device, said method comprising the steps of:

predetermining a visibility map for a surface of a predetermined graphical element for use in the computation of global illumination within a predetermined scene, said visibility map containing a repeating pattern of four eight bit components, wherein each component represents a percentage of the corresponding portion that is visible from the surface at a point, wherein said surface is subdivided to include a plurality of polygons, and, for each of said polygons, wherein said visibility map defines, for a plurality of regular surface subdivisions of a hemisphere associated with a corresponding polygon, the relative visibility of said regular surface subdivision to incident global illumination; and storing said visibility map accessible by a graphics rendering subsystem.

2. The method of claim 1 including computing, in conjunction with the operation of said graphics rendering subsystem, incident global illumination values for said plurality polygons, wherein for a receiver polygon the incident global illumination value is determined as the sum of light received as transferred from emitter polygons subject to a form factor radiance transfer function between said emitter and receiver polygons, wherein for each emitter polygon the contributed portion of the incident global illumination value is apportioned relative to said regular surface subdivisions of said receiver polygon based on the oriented relation of a vector from the center of said receiver polygon to the center of said emitter polygon and the normalized normal of the receiver polygon, and wherein the incident global illumination for a receiver polygon is determined as $$I = L1*s1 + L2*s2 + L3*s3 + \ldots + Ln*sn$$

where $L1 \ldots Ln$ are the aggregate apportioned regular surface subdivision light values and $s1 \ldots sn$ are the corresponding regular surface subdivision visibility values for the corresponding said receiver polygon as stored by said visibility map.

3. The method of claim 2 wherein the value of the relative visibility of said regular surface subdivisions are precomputed for each of said plurality polygons based on relative occlusion by adjacent surface geometry and perturbed normal direction of each of said plurality polygons.

4. The method of claim 3 wherein said plurality of regular surface subdivisions are oriented relative to surface normal and orthogonal surface tangent vectors.

5. The method of claim 4 wherein the incident global illumination value for each said receiver polygon is summed as a set of color component values $$I = \sum_1^n L_{red}x * sx + L_{green}x * sx + L_{blue}x * sx,$$

where n is the number of said regular surface subdivisions, $L_{red}x$, $L_{green}x$, and $L_{blue}x$ are the apportioned regular surface subdivision color component light values and sx is the corresponding regular surface subdivision color component visibility value for the corresponding said receiver polygon as stored by said visibility map.

6. The method of claim 5 wherein an adjusted illumination contribution for each of said regular surface subdivisions is proportional to a relative incident illumination angle as $$I_{n'} = \left((1-z)I_n + \frac{z}{n}\right)q_n$$

where $I_{n'}$ is the adjusted illumination contribution for a respective subdivision of said regular surface subdivisions, z is the incident illumination angle for an incident light contribution $I_n$ defined in a range between 0 and 1, n is the number of said regular surface subdivisions, and $q_n$ is the corresponding regular surface subdivision color component visibility value for the corresponding said receiver polygon as stored by said visibility map.

7. The method of claim 6 further providing for the additional incorporation of a specular light intensity component computed dependent on the relative incident illumination angles of the adjusted illumination contributions, wherein the adjusted illumination contributions are treated as separate directional lights.

8. The method of claim 7 wherein specular illumination contributions for each of said regular surface subdivisions is computed as proportional to a corresponding reflection vector ($R_n$)

$$R_n = 2(Ns \cdot L_n)^* Ns - L_n$$

where Ns is the shading normal, and $L_n$ specifies a respective light direction vector corresponding to said regular surface subdivision.

9. The method of claim 8 wherein a specular illumination contribution ($S_n$) is computed as $$S_n 9 = L_n K S_m \max((R_n \cdot V), 0)^x$$

where $L_n$ is the light intensity value, K is a specular intensity value defined for the material of said receiver polygon, $S_m$ is a defined specular color value defined for the material of said receiver polygon, $R_n$ is the reflection vector, V is the vector from said receiver polygon to a viewer, and x is a shininess value defined for the material of said receiver polygon.

10. The method of claim 4 and claim 9 wherein said plurality of regular surface subdivisions corresponds to quadrant subdivisions of said hemisphere centered in the direction of four vectors $N0=(N+T_1)$, $N1=(N+T_2)$, $N2=(N-T_1)$, and $N3=(N-T_2)$, where N is the surface normal and $T_1$ and $T_2$ are orthogonal surface tangent vectors.

11. The method of claim 10 wherein said visibility map stores four visibility values, corresponding to said four vectors, for each of said plurality of polygons.

12. A computer implemented method of rendering surfaces subject to global illumination in the production of image data representative of a scene containing defined elements for display on a display device, said method comprising the steps of:
  a) first determining an aggregate value of incident light received by each of a plurality of polygons defined within a control mesh representing an element, wherein incident light from an emitter polygon is distributed with respect to a receiver polygon as a plurality of incident light values corresponding to a plurality of regular surface subdivisions of a hemisphere above the surface of a respective receiver polygon; and
  b) second determining the global illumination of each of said plurality of polygons by computing for each receiver polygon a sum of the products of the incident light values and a corresponding plurality of regular surface subdivision visibility values selected from a precomputed visibility map defined with respect to said element, wherein said precomputed visibility map defines for each of said plurality of polygons a relative visibility value for each said regular surface subdivision of said plurality of regular surface subdivisions.

13. The computer implemented method of claim 12 wherein said plurality of regular surface subdivisions are oriented relative to surface normal and surface tangent vectors, and wherein incident light received by said receiver polygon from said emitter polygon is computed as proportional to the cosine of the angle between a vector from the surface center of said receiver polygon and the surface center of said emitter polygon and hemispheric direction vectors defined by said regular surface subdivisions associated with said receiver polygon,
  whereby sets of light intensity values, corresponding to said regular surface subdivisions, are determined for said plurality of polygons and wherein each light intensity value represents an aggregate of the incident light received by a corresponding receiver polygon from the other polygons of said plurality of polygons, with respect to a corresponding one of said regular surface subdivisions.

14. The computer implemented method of claim 13 wherein each light intensity value includes three color component values.

15. The computer implemented method of claim 14 wherein said regular surface subdivisions are hemispheric quadrants having four quadrant direction vectors defined as $$Q_1 = N_R + T_1, \ Q_2 = N_R + T_2, \ Q_3 = N_R - T_1, \text{ and } Q_4 = N_R - T_2,$$

where $N_R$ is the polygon surface normal, $T_1$ is the polygon tangent vector and $T_2$ is the binormal tangent vector.

16. The computer implemented method of claim 15 wherein each of the visibility values stored by the precomputed visibility map includes three color component values and an alpha transparency value.

17. A computer implemented method of determining the illumination of texels in production of image data representative of a scene containing defined elements, subdivided as texels, for display on a display device, said method comprising the steps of:
  a) first computing a plurality of aggregated directionally dependent intensity of light values incident on a predetermined texel with respect to a plurality of regular surface subdivisions of a hemisphere centered on a surface of said predetermined texels;
  b) second computing a global illumination value for said predetermined texel determined as $$I = L1^* s1 + L2^* s2 + L3^* s3 + \ldots + Ln^* sn$$

where $L1 \ldots Ln$ are the aggregated directionally dependent light values and $s1 \ldots sn$ are corresponding regular surface subdivision visibility values for said predetermined texel as stored by a visibility map;
  c) third computing a specular illumination value for said predetermined texel as a sum of specular illumination contributions determined using each of said aggregated directionally dependent light values $$S = LKS_m \max((R \cdot V), 0)^n$$

where L is a corresponding aggregated directionally dependent light value, K is a specular intensity predefined for the material of said texel, $S_m$ is a predefined specular color for the material of said texel, R is a reflection vector determined with respect to the incident angle of said corresponding aggregated directionally dependent light value, V is a vector from said texel to a viewer, and n is a predefined shininess value for the material of said texels; and
  d) summing said global illumination value and said specular illumination value to determine an illumination of said texel.

18. The computer implemented method of claim 17 further comprising the step of modifying said specular intensity predefined for the material of said texel by an attenuation factor dependent on said vector (V) from said texel to said viewer.

19. The computer implemented method of claim 18 wherein said attenuation factor is a Fresnel attenuation factor.

20. The computer implemented method of claim 18 wherein said plurality of regular surface subdivisions are defined by four quadrant direction vectors defined as $$Q_1 = N_R + T_1, \ Q_2 = N_R + T_2, \ Q_3 = N_R - T_1, \text{ and}$$

$$Q_4 = N_R - T_2,$$

where $N_R$ is the polygon surface normal, $T_1$ is the polygon tangent vector and $T_2$ is the binormal tangent vector.

* * * * *

UNITED STATES PATENT AND TRADEMARK OFFICE
CERTIFICATE OF CORRECTION

PATENT NO. : 7,864,177 B2
APPLICATION NO. : 12/214814
DATED : January 4, 2011
INVENTOR(S) : Michael T. Bunnell It is certified that error appears in the above-identified patent and that said Letters Patent is hereby corrected as shown below:

Column 17:

Claim 9, line 12, "$S_n9 = L_n KS_m \max((R_n \cdot V), 0)^x$" should be -- $S_n = L_n KS_m \max((R_n \cdot V), 0)^x$ --.

Signed and Sealed this
Twenty-first Day of June, 2011

David J. Kappos
*Director of the United States Patent and Trademark Office*